Patented Nov. 1, 1932

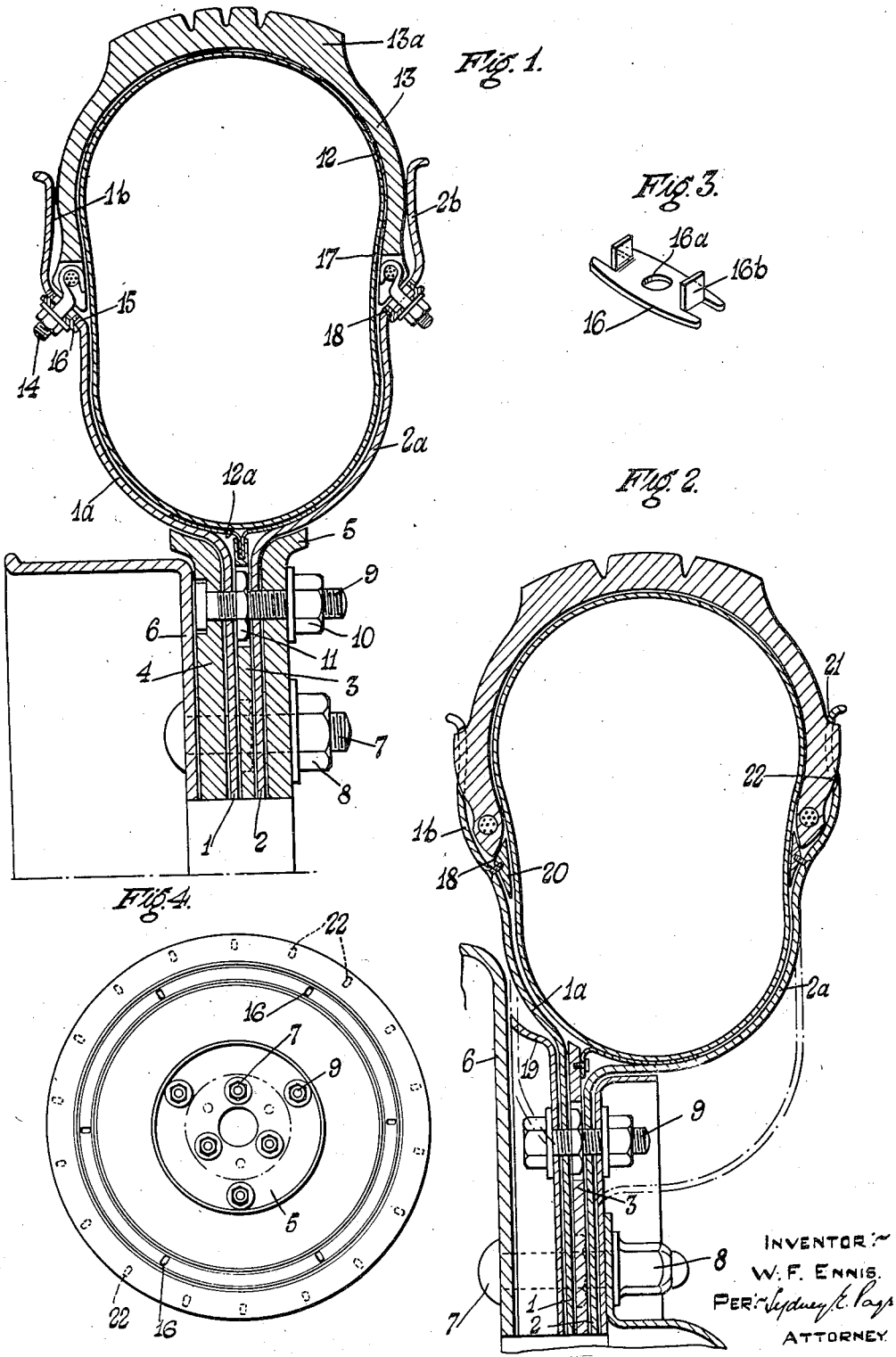

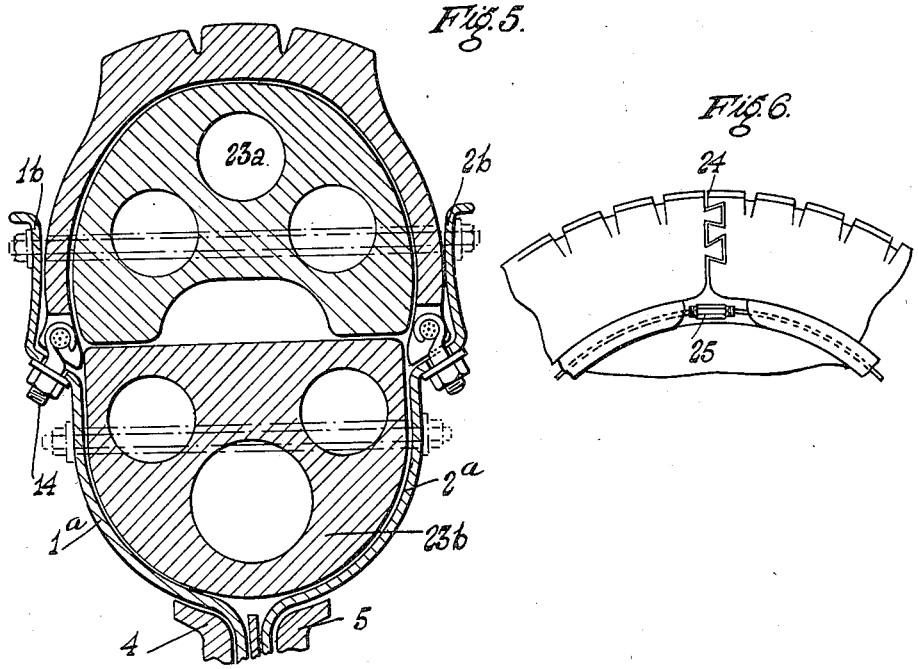
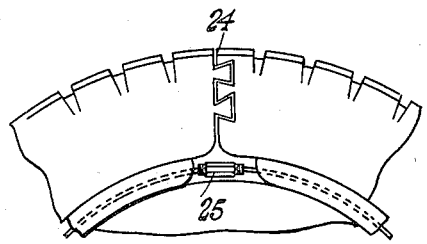
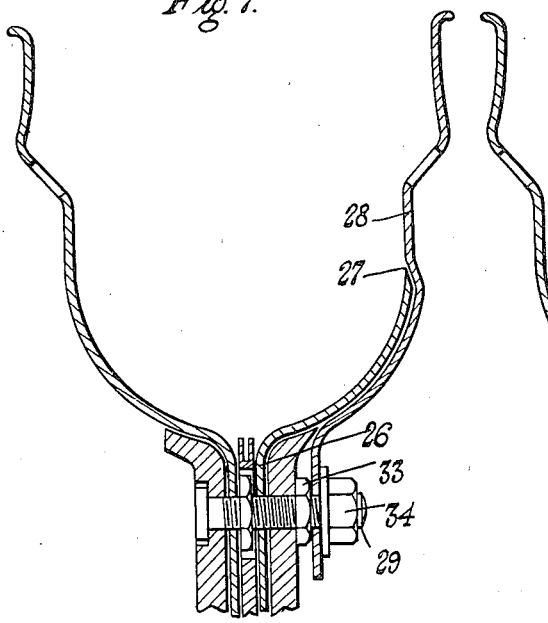
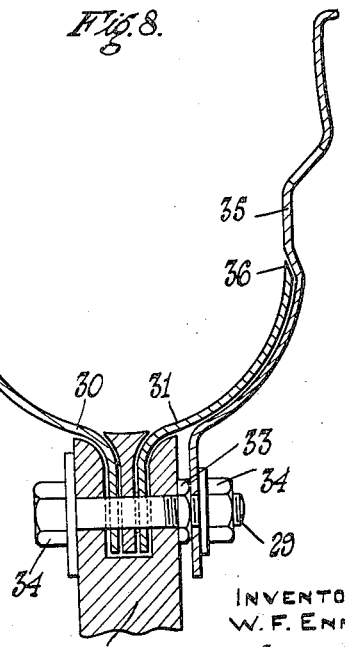

1,885,901

UNITED STATES PATENT OFFICE

WILLIAM FRANCIS ENNIS, OF ZAMALEK, CAIRO, EGYPT

SOLID AND PNEUMATIC TIRED WHEEL

Application filed July 6, 1931, Serial No. 548,836, and in Great Britain July 30, 1930.

This invention relates to resiliently tired wheels for vehicles.

It is well known to construct pneumatic tires of a relatively large cross section, and to attach the covers of such tires to the wheel rims by beading or like formation located at or near the edge of the tire cover, the rim, in such cases, housing only the beaded portion, and leaving the rest of the tire protruding beyond the rim.

Such a method of construction, however, imposes a limit upon the cross sectional area of the tire that may conveniently be employed, owing to the stresses that are produced in the walls of the tire.

A principal object of the present invention is to provide a very simple and improved method of construction whereby it is possible to obtain a maximum of cross sectional area of tire or a tire of relatively great depth in proportion to its width within a given wheel circumference, thereby obtaining great resilience and shock-absorbing quality, and at the same time, to provide support to those portions of the tire wherein large stresses are produced.

It will be understood that in carrying out this invention, it is contemplated that a pneumatic tire of the inflated type will principally be employed, but that the invention is equally applicable to cushion tires, solid tires, or perforated solid tires.

Referring now to the several figures of the accompanying drawings from which the features of the invention will be clear.

Fig. 1 is a part sectional view showing a wheel constructed according to this invention and carrying a pneumatic tire;

Fig. 2 is a part sectional view of a modified form of the wheel shown in Figure 1, intended to be employed in cases where the diameter of the brake drum of the vehicle is large relative to the diameter of the concavity of the wheel, and also showing an alternative method of preventing relative movement between the cover and the plate. It will be understood that the dished parts of the plates may be extended inwards towards the hub of the wheel, the maximum air space within the tube and tire being obtained when the diameter of the united surfaces is restricted to the absolute minimum required for the attachment of the wheel to the vehicle.

Fig. 3 shows a detail of a packing member employed in the construction shown in Fig. 1;

Fig. 4 is a side elevation of a wheel constructed according to Fig. 1 but without a tire attached and showing in dotted lines modifications shown in Fig. 2;

Fig. 5 shows a part sectional view of a construction similar to Fig. 1 but with the wheel carrying a perforated solid tire;

Fig. 6 shows a manner of interconnecting portions of an outer cover formed in segments, whilst Figs. 7 and 8 are part sectional views showing modified forms of the wheel illustrated in the preceding drawings.

Referring now more particularly to Fig. 1, references 1 and 2 designate disc members or annular wall plates, which are attached to the wheel structure or framework. These plates are formed with dished flanges 1a and 2a which, when the plates are clamped together, form a channel or cavity housing the greater part of the inner tire. Supplementary flanges 1b and 2b are formed about the peripheries of these flanged discs for the purpose of accommodating the beaded portion, and part of the sides or walls of the outer cover.

A suitable packing 3 is interposed between the plane or abutting portions of the discs, and strengthening or distance plates 4 and 5 are located on the outer sides of the discs 1 and 2, the composite wheel being attached to a brake drum 6 or other suitable part of the vehicle by means of bolts 7 and nuts 8. The numeral 9 represents one of the bolts whereby the discs 1 and 2 are clamped together independently of the bolts 7 attaching the wheel to the brake drum, the bolts 9 being provided with nuts 10 on the outer extremity, whilst the nuts 11 disposed within recesses in the packing 3 serve to clamp the disc 1 and distance piece 4 independently, so as to facilitate detaching of the disc 2 for the purpose of placing on, or removing, a tire. It will be understood that bolts 9 may be interspaced between bolts 7 when it is desirable to increase the depth of the tire space between the wheel plates.

12 represents the inner tube, and 13 the outer tire cover having a tread portion 13a projecting beyond the periphery of the wheel plates. 12a represents a protective strip of hard rubber or other suitable material interposed between the inner tube and the inner surface of the wheel plates to form a bed for the inner tube of such lateral dimension as to be capable of holding the inner tube when the outer plate is detached. In this case it is shown secured to the periphery of the packing 3. The cover is attached to the rim by means of bolts 14, hooked or otherwise connected to the foundation or reinforcement wires in the cover 13, for which purpose holes 17 are provided in the cover adjacent to the reinforcement wires.

These bolts pass through apertures 15 in the wall plate, and nuts located upon the outer ends of the bolts, so as to bear against the outer face of the plate, draw the cover against the plate; seating surfaces 18 being preferably provided between the tire and the inner surface of the portions of the wheel plates forming the supplementary channels.

Flanged washers 16 may be conveniently employed to locate the bolts 14 within the apertures 15 and also to prevent the ingress of grit through these apertures. These flanged washers 16 are shown in detail in Fig. 3 and are provided with bores 16a through which the bolts 14 pass, and flanges 16b adapted to bear against the sides of the apertures 15.

Fig. 2 shows a modified form of construction which is particularly suitable when the diameter of the concavity of the composite wheel is small relative to the diameter of the brake drum, so that in this construction the dished flanges 1a would not, as in Fig. 1, protrude outside the periphery of the brake drum 6, but would tend to bear flush against its outer face. In this form of construction, therefore, the disc 1 is dished to a lesser extent than the related disc 2, so that the plane or hub portions of the discs are not disposed centrally of the composite wheel as will be readily seen from Fig. 2. A distance piece in the form of a dished plate 19 is interposed between the disc 1 and the brake drum against which the flange of the disc seats.

It is understood that the dimension of the dished parts of one or both plates may vary according to the condition of the parts of the vehicle to which the wheel is to be fitted, extending further inwards in some cases towards the hub as to the position shown dotted in Fig. 2, in which case the bolts 9 may be interspaced between the bolts 7, as shown dotted in Fig. 3.

A further modification resides in forming the tire cover seating 18 in the form of a groove by means of fillets 20 of suitable material as, for example, wood or fibre, suitably attached to the rim as by screws, whilst in order to prevent circumferential creepage of the tire, the bolts 14 shown in Fig. 1 are replaced by studs or other protuberances 21, detachable or integral with the tire outer cover, disposed upon the sides of the cover and adapted to engage apertures 22 in the rim.

Fig. 5 shows an example of a tire employing a perforated solid inner tire which, in this case, is formed in two sections 23a and 23b.

With such tires lateral bolts may be employed to retain the tire in position, two suitable positions for such bolts being indicated by dotted lines.

It will be understood that the construction of the wheel should be such as to enable the tire to be readily detached therefrom, or inserted therein, and an alternative manner of effecting this is shown in Fig. 6, which shows a tire formed in circumferential sections dove-tailed together at 24, the strengthening wires being connected by means of strainers 25. The adoption of circumferential sections is also intended to avoid renewal of the entire tread cover in cases of partial rupture.

A still further manner of facilitating attachment and removal of the tires is shown by Fig. 7, wherein the wheel is formed as shown in Fig. 1, with the exception that the disc member 26 in this case terminates at 27, and is completed by means of a detachable member 28, which may be attached to the disc 26, and the composite wheel, by means of bolts 29 (9 of Figs. 1 and 2) which carries two nuts 33 and 34, of which 33 serves to hold the composite wheel assembled independent of the member 28, which is secured by the nut 34.

This type of construction may be used in conjunction with spoked wheels, when the radial depth of tire is relatively slight, as shown in Fig. 8, wherein the combined dished plates 30 and 31 are slotted into the periphery of the spokes 32 of the wheel, and secured thereto and therein by means of bolts 29 and nuts 33 and 34, nut 33 serving to hold the dished plates secured to the spoked wheel while the detachable disc member 35 is detached for removing or replacing the tire.

In these latter forms of construction shown by Figs. 7 and 8, it is only necessary to remove the nuts on the bolts 29 and remove the members 28 and 35 when it is desired to take off or put on a tire.

It will be understood that the diameter of the wheel to the joints 27 and 36 of the discs may vary, but must never be more than the diameter of the inner edge of the tire cover, to permit of the tire cover passing over it.

In the construction shown in Fig. 8 means (not shown) are preferably provided to permit of removal of the plates 30 and 31 from the spokes for repair purposes, such means may for example, comprise forming the spokes on two axial sections bolted together or forming the inwardly projecting portions of the plates only at the points which are housed by the spoke channels so that a relative circumferential movement of the rim and spokes enables the rim portions 30 and 31 to be removed.

What I claim is:

1. A vehicle wheel adapted to carry a resilient tire and a beaded edge cover comprising in combination with a wheel frame, a pair of disc plates flanged outwardly and then approximately parallel to the plane of the disc plates to form a relatively deep tire housing channel, the parallel sides of the said channel being bent intermediately between the periphery and the base of the channel to form annular open seatings for mounting the beaded edge of the cover so that the tread of the cover projects beyond the periphery of the channel with a large proportion of the tire located in the portion of the channel below the said seatings, the sides of the said channel above the said seatings serving to support the sides of the cover when assembled, packing between the body of said plates between the said channel, bolts passing through holes in the said frame and disc plates and through recesses in the said packing, internal nuts to the said bolts disposed within the recesses in the packing to clamp one of said disc plates to the frame, and outer nuts to the said bolts clamping the second disc plate against the said packing so that the said second disc plate can be readily removed for the purpose of mounting and demounting the tire.

2. A vehicle wheel adapted to carry a resilient tire and a beaded edge cover, comprising in combination with a wheel frame, a pair of discs flanged outwardly and then approximately parallel to the plane of the discs to constitute the sides of a tire housing channel, one of said discs then being bent intermediately between its periphery and the flange to form an annular open seating for one beaded edge of the cover so that the tread of the cover projects beyond the said periphery with a large proportion of the tire adapted to be held by the part of the said disc below the seating, the other disc being terminated below the said seating, a detachable disc member completing the said channel, said member being flanged to correspond with the terminated disc so as to present a smooth inner surface to the portion of the channel below the said seating, and being further bent below its periphery to provide a complemental seating for the other beaded edge of the cover, bolts passing through holes in the frame and in the portions of the said discs and the said disc member below the flanges, internal nuts to the bolts clamping the said discs to the frame and outer nuts to the said bolts clamping the said disc member in rigid relation to said discs whilst permitting the said disc member to be readily detached.

3. A vehicle wheel adapted to carry a resilient tire and a beaded edge cover comprising in combination with a wheel frame, a pair of disc plates flanged outwardly and then approximately parallel to the plane of the disc plates to form a relatively deep tire housing channel, the parallel sides of the said channel being bent intermediately between the periphery and the base of the channel to form annular open seatings for mounting the beaded edge of the cover so that the tread of the cover projects beyond the periphery of the channel with a large proportion of the tire located in the portion of the the channel, below the said seatings, the sides of the said channel above the said seatings serving to support the sides of the cover when assembled, and means for removably securing the disc plates to the wheel frame, so that one disc plate can be easily removed for the purpose of mounting the tire, comprising bolts passing through holes in the disc plates and the frame, internal nuts to said bolts clamping one disc plate to the frame and outer nuts to said bolts clamping the second disc plate to the first disc plate with the internal nuts between the said disc plates.

In testimony whereof I affix my signature.

WILLIAM F. ENNIS.